US008898867B2

(12) United States Patent
Braun et al.

(10) Patent No.: US 8,898,867 B2
(45) Date of Patent: Dec. 2, 2014

(54) MOUNTING DEVICE (75) Inventors: Klaus Braun, Wildberg (DE); Gabi Carle, Wildeberg (DE); Kurt Hoehe, Langenau (DE); Bernd Ruess, Ulm (DE); Matthias Laske, Juelich (DE)

(73) Assignees: Hoelzel Stanz-und Feinwerktechnik GmbH & Co. Kg, Wildberg (DE); Reinz-Dichtungs-GmbH, Neu-Ulm (DE)

( * ) Notice: Subject to any disclaimer, the term of this patent is extended or adjusted under 35 U.S.C. 154(b) by 946 days.

(21) Appl. No.: 12/737,174

(22) PCT Filed: Jun. 30, 2009

(86) PCT No.: PCT/EP2009/004715
§ 371 (c)(1),
(2), (4) Date: Sep. 19, 2011

(87) PCT Pub. No.: WO2010/000444
PCT Pub. Date: Jan. 7, 2010

(65) Prior Publication Data
US 2012/0006959 A1     Jan. 12, 2012

(30) Foreign Application Priority Data
Jul. 2, 2008   (DE) .................... 10 2008 031 251

(51) Int. Cl.
*F16M 13/00*   (2006.01)
*B21D 31/00*   (2006.01)
*F16B 5/07*    (2006.01)

(52) U.S. Cl.
CPC ........................................ *F16B 5/07* (2013.01)
USPC .................. 24/442; 24/450; 24/452

(58) Field of Classification Search
CPC ........................................................ F16B 5/07
USPC ........... 24/306, 442, 447, 449, 450, 452, 700;
248/309.1, 316.7, 346.5; 40/124,
40/124.4; 427/290
See application file for complete search history.

(56) References Cited

U.S. PATENT DOCUMENTS

| 2,226,976 | A | * | 12/1940 | Leaming ..................... 40/405 |
| 2,532,132 | A | * | 11/1950 | Vogel ........................ 40/124.4 |
| 2,916,843 | A | * | 12/1959 | Meyer ............................. 428/8 |
| 4,008,742 | A | * | 2/1977 | Lemler ......................... 150/147 |
| 4,105,057 | A | * | 8/1978 | Baumann et al. ............ 150/132 |
| 4,571,867 | A | * | 2/1986 | Williams ........................ 40/405 |
| 5,376,410 | A | | 12/1994 | MacKelvie |
| 2008/0244878 | A1 | | 10/2008 | Hoehe et al. |
| 2010/0001152 | A1 | | 1/2010 | Golle et al. |

FOREIGN PATENT DOCUMENTS

DE           44 41 095 A1     5/1996
DE   10 2004 048 464 A1     4/2006
(Continued)

*Primary Examiner* — Robert J. Sandy
*Assistant Examiner* — Louis Mercado
(74) *Attorney, Agent, or Firm* — Marshall & Melhorn, LLC (57) ABSTRACT A mounting device with one metallic base plate, from which a plurality of mounting eyelets protrude. The mounting device is obtainable by incising a plurality of arc-shaped eyelet blanks while leaving two connection sections per eyelet blank into the surface of the base plate and production of the mounting eyelets by bending the eyelet blanks out of the base plate around a bending edge in the area of the connection sections. At least part of the eyelet blanks are arranged as groups of eyelet blanks with the latter being nested to each other. Preferably, the groups of eyelet blanks are arranged rotated relative to each other.

20 Claims, 9 Drawing Sheets

(56) References Cited

FOREIGN PATENT DOCUMENTS

| | | | |
|---|---|---|---|
| DE | 10 2006 015 145 A1 | 10/2007 | |
| DE | 10 2006 015 148 A1 | 10/2007 | |
| DE | 10 2006 015 100 B4 | 4/2008 | |
| WO | WO 2006037624 A1 * | 4/2006 | B23K 26/38 |

* cited by examiner

MOUNTING DEVICE

BACKGROUND OF THE INVENTION

The invention relates to a mounting device with a metallic base plate, above which a plurality of mounting eyelets protrude, and a method for the production of such a mounting device.

In many industrial and other areas (e.g. building, automobile production, household etc.) it is regularly necessary to mount metallic parts or components or to connect them with other parts. There it is often desirable to produce the mounting devices and the closure in a simple and rapid manner, without the need of special tools, such as welding or screwing tools for the mounting. In the field of plastic parts, such a mounting is achieved by use of hook-and-loop closures as mounting devices. For a large range of applications, these plastic hook-and-loop closures can however not be used, as they do not provide for the necessary durability and temperature stability or as they show no electrical conductivity. Therefore, the application has already proposed mounting devices from metal, which provide for the same mounting properties as do plastic hook-and-loop closures. These "metallic hook-and-loop closures" are for instance described in DE 10 2004 048 464 A1, DE 10 2006 015 100 B4, DE 10 2006 015 145 A1 and DE 10 2006 015 148 B4.

The counterparts for the closures of the mounting protrusions of the metallic hook-and-loop closures mentioned above are selected from loop fleeces made from metal, wire scrims, wire knitting, metal meshes or perforated metal sheets. The counterparts made from metal wire however have the drawback that on the one hand their production is expensive and elaborate and on the other hand that the metallic scrim tends to fray and the metallic loops beak, which provides a risk for injury and reduces the durability. Perforated metal sheets have the disadvantage that the mounting protrusions can only be fixed in a distinct orientation in the counterpart. This considerably restricts the applicability of these counterparts.

BRIEF SUMMARY OF THE INVENTION

It is therefore the object of the invention to provide a mounting device for a hook-and-loop closure that can be used universally, combined with a large variety of counterparts, receives the latter in almost every orientation, provides for a repeatable and detachable closure with high retention force and the production of which is moreover inexpensive.

This object is achieved with a mounting device according to claim 1. Preferred embodiments are described in dependent claims 2 to 10. The invention further relates to a method according to claim 11 for the production of the mounting device. Preferred versions of the method are given in claims 12 to 15.

In a first aspect the invention thus relates to a mounting device with a metallic base plate, above which a plurality of mounting eyelets protrude. The mounting device is obtainable by incising a plurality of arc-shaped blanks for eyelets while keeping two connection sections per eyelet blank and then bending the eyelet blanks out of the base plate at a bending edge in the area of the connection sections. Thereby, several eyelet blanks forming groups are incised into the base plate. A group consists of at least two, preferably 2 to 10 and more preferable 2 to 5 eyelet blanks, which are nested in such a way that at least a subarea of one eyelet blank is situated within another eyelet blank.

Alternatively, the eyelets can be produced by shearing. There, the arc-shaped eyelets are bent out of the base plate plane immediately during the shearing. This means that both production steps—cutting and bending—are performed simultaneously. Notwithstanding, in the following the term "blank" is used no matter whether the eyelets are first cut and then bent or bent during cutting.

The eyelet blanks of a group can be identical or different. In a particularly simple arrangement, all eyelet blanks have the same size and form. For example, several V- or U-shaped eyelet blanks can be arranged within and behind each other. In order to save material, the eyelet blanks of a group can immediately adjoin each other and thus be cut without producing waste. In this way, two neighbouring eyelet blanks share at least one cutting line. It is however also possible to excise broader clearances between neighbouring eyelet blanks in the base plate which results in a distance between the eyelet blanks of one group in the base plate. This arrangement for instance facilitates the bending of the eyelet blanks from the base plate, since no frictions between neighbouring blanks occur.

It is preferred that the eyelet blanks of a group are arranged in such a way that their connecting sections and bending edges are arranged in parallel. In such a case it is useful to bend the eyelet blanks with different bending or resulting angles from the base plate, in order that the crest areas of the mounting eyelets in the finished mounting device do not come to lie one above the other. An alternative is given by providing an offset between the connection sections of the eyelet blanks within one group with respect to height. A view on the innermost eyelet blank of a group from its connection section in the direction of its crest point shows that the connection sections of the eyelet blanks which are arranged more outward are shifted further to the crest of the innermost eyelet blank. The more outward the eyelet blanks are situated, the more the connection sections may be shifted upward, or a zigzag shaped arrangement is also possible in which the connection sections of a more outwardly situated eyelet blank are nearer to those of the innermost eyelet blank than the connection sections of the next outward eyelet blank. Which arrangement ever is chosen, the bent mounting eyelets are arranged in series. This allows the mounting protrusions of the counterpart to engage into the clearances between the neighbouring mounting eyelets when mounted. This provides for more closure opportunities than if only isolated mounting eyelets are provided. It is however not necessary that each clearance between neighbouring mounting eyelets takes up a mounting protrusion of the counterpart.

It is especially advantageous during closure and detachment that the mounting eyelets are flexible. The arc-shaped mounting eyelets on the one hand can be elastically shifted in the bending direction. On the other hand, the mounting eyelets themselves can be stretched or compressed in the pushing or pulling direction in which the mounting protrusions of the counterpart are moved, at least if the thickness of the base plate and the web width of the arc-shaped eyelet blanks have not been chosen too large. The elastic deformability of the mounting eyelets facilitates both the mounting of the mounting protrusions to the mounting eyelets and the detachment of the counterpart from the mounting device according to the invention.

The shape of the eyelet blanks can be arbitrary and is preferably chosen according to the shape and size of the mounting protrusions to be fastened. The eyelet blanks remain connected to the base plate through two connection sections and extend arc-shaped between these two connection sections. In one embodiment, this arc is a round arc, which possesses the shape of a circular arc or more preferable an oval shape. The distance between the two connection sections is independent of the distance between the crest of the oval and the connection section(s), thus it can be longer, identical or shorter. In another embodiment, the arc between the connection sections is angular and in its course shows preferably 1 to 4, especially 2 angles. With one angle, a V-shaped eyelet blank results, with two angles an essentially U-shaped one. The latter as well as other shapes with a flattened crest plateau are preferred as they provide for a relatively large range behind which a mounting protrusion of the counterpart can hook. In general it is possible that different eyelet blanks are formed within one group, provided that they can be nested. The eyelet blanks are preferably mirror-symmetrical with respect to a plane that extends centrally between the connecting sections and rectangular to the base plate, they can however also be asymmetric with respect to this plane.

The eyelet blanks preferably show at least one of the following properties:

The flanks of the eyelet blanks are preferably inclined and show an angle between the flank of the eyelet blank and the bending edge of less than 90°. The angle is here measured at the external side of the flank. Especially preferred are flank angles between 40 and 85°. The dimensions of the eyelet blanks and therefore of the eyelets as such conform preferably to the dimensions of the mounting protrusions of the counterpart. Width and height of an individual eyelet blank are preferably dimensioned in such a way that the head of the mounting protrusion of a counterpart can be taken up in the eyelet. For example, the width of an eyelet blank in the area of the connection sections is at least 0.4 mm. Advantageous widths in this area range between 0.5 to 10 mm. The height of an eyelet blank ranges for example between 0.5 and 10 mm and preferably between 1 and 4 mm. Width and height of the eyelet blanks can also be determined relative to the sheet thickness, thus the thickness of the metallic base plate. The height of an eyelet blank can range between the 2 to 20 fold the value of the sheet thickness, while the width preferably amounts to at least the 3 fold of the sheet thickness.

The web width—thus the distance between the lateral edges of the arc-shaped eyelet blanks—is preferably only as large as necessary during the production and use of the mounting device according to the invention. The mounting eyelets shall not break or crack especially during bending them out of the plane of the base plate as well as during use with push and pull strain. The web widths accordingly also depend on the choice of the material for the base plate and its sheet thickness. Web widths used in practice range between the 0.5 fold and double, especially the 0.7 and 1 fold of the material thickness of the base plate. In general, web widths larger than 0.05, especially larger than 0.15 mm, are suitable. The web width can vary in between neighbouring eyelet blanks as well as in the course of a single eyelet blank.

Actually it is possible to vary the design (form, size, amount and distribution) of the arc-shaped eyelet blanks over the area of the metallic base plate. The amount and stability of the eyelet blanks can be increased in those areas, in which during use extremely high forces are to be expected. From a production perspective, it is however preferred that the eyelet blanks be uniform and uniformly distributed over the complete area of the metallic base plate.

During or after the incision of the eyelet blanks, the latter are bent out of the plane of the base plate around a bending edge which is situated in the area of the two connection sections, through which the eyelet blanks are linked to the base plate. The bending angle, that is, the angle at the bending edge, can be chosen with only few restrictions. Bending angles larger than 90° are not really recommended as they mean an increased strain of the material. Thus, it is preferred that the bending angle is at most 90°. The eyelet blanks can be bent from the base plate in such a way that they keep the plane shape given by the base plate. Dependent on the material thickness and the particular manner of bending, it is however also possible that the mounting eyelets deform in their longitudinal extension direction and therefore, in this direction, as a whole are not flat, but arc-shaped. A total angle, i.e., an angle between the base plate and a line through the crest point and the bending section, may arise which is larger than 90°, but in general not larger than 135°. This means that the crests and its immediate neighbourhood extend beyond a vertical line through the bending edge.

In a preferred embodiment of the invention the groups of eyelet blanks are arranged in the base plate in essentially parallel rows with at least two, preferably at least four, groups of eyelet blanks per row. The flexibility of such an arrangement is increased if the groups of eyelet blanks in neighbouring rows are staggered relative to each other. It is especially preferred that they have such an offset that the groups of every second, preferably of every third, row are situated at the original position. In this preferred embodiment, the groups of eyelet blanks are thus arranged in a pattern of two or three rows.

In another preferred embodiment of the invention at least one group of eyelet blanks is formed in such a manner in the base plate that it is arranged rotated relative to another group of eyelet blanks on the base plate. Because of this rotation of the groups of eyelet blanks relative to each other, after the erection of the eyelet blanks from the base plate, eyelets result which at least partially protrude in a twisted manner from the base plate. These different orientations of the eyelets—or to be more precise—their respective groups—on the base plate considerably facilitate the hooking of the mounting protrusions of the counterpart to be mounted. With this rotated orientation, it is much easier for a mounting protrusion to engage into a fittingly oriented mounting eyelet than would be the case with aligned mounting eyelets. An exact orientation of the mounting protrusions relative to the mounting perforations or mounting eyelets is thus not necessary, as was the case in the state of the art. With a suitable choice of the relative distances and orientations of the mounting eyelets on the base plate as well as a suitable choice of the size of the eyelets themselves the mounting device can be adapted to every counterpart provided with suitable mounting protrusions. On the one hand, the mounting protrusions can be fastened in a mounting device by hooking into a mounting eyelet. On the other hand, it is also possible that one or several mounting protrusions entangle simultaneously between neighbouring mounting eyelets. As the distances between the mounting eyelets on the base plate vary relative to each other due to the rotation of their groups, all or at least several opportunities for fastening will occur simultaneously. The different opportunities for engagement of the mounting protrusions into the mounting device according to the invention, on the one hand, facilitate the production of a stable but detachable closure and, on the other hand, in fact allow a free choice of the orientation of the counterpart relative to the mounting device according to the invention.

The particular rotation of the groups of eyelet blanks relative to each other on the base plate depends mainly on the design of the counterpart to be fastened. The eyelet blanks can for instance be oriented irregularly and purely statistical on the base plate. It is however preferred that the groups of eyelet blanks are rotated only at distinct angles relative to each other. The angle refers to the angle at which the virtual prolongations of the bending edges of eyelet blanks of two neighbouring groups intersect. It is preferred that this angle is between 30 and 180°. An angle of 180° in this respect means that the two groups of eyelet blanks (apart from an optional lateral offset) face each other mirror-symmetrically. It is especially preferred that the groups of eyelet blanks are rotated under an angle of 60°, 90° or 180° relative to each other.

Even further variations of the form of the mounting eyelets result if at least part of the eyelets in their crest area are cut through. This cut can already be accomplished before the eyelet blank is bent from the base plate. It is however also possible to cut through the crest area of the mounting eyelets only during or after their bending of the base plate, e.g. using laser radiation or using other suitable methods. This allows to quasi produce two mounting eyelets out of one, which further increases the opportunities for the fastening. It is advantageous in this respect that the termini of the cut crest area of a mounting eyelet point towards each other and thus in opposite directions.

The invention further relates to a method for the production of the mounting device. This comprises as one step the incising of a plurality of eyelet blanks while keeping two connection sections with the base plate. This means that the lateral edges of the arc are cut free while the eyelet blank is still connected to the base plate at the connection sections. The eyelet blanks are incised into the base plate as groups, with a group comprising at least 2, especially 2 to 10, preferably 2 to 5, eyelet blanks which are nested with each other in such a way that at least a subarea of one eyelet blank is situated within the other eyelet blank. During or after the incision of the eyelet blanks, the latter are bent out of the base plate in the area of the connection sections in such a way that the eyelet blanks protrude as mounting eyelets from the base plate. The eyelet blanks are preferably incised in such a manner that at least some groups of eyelets are rotated relative to each other.

Incision of the eyelet blanks can be performed by any suitable method. It is however preferred that the eyelet blanks be punched, cut by laser radiation or sheared. It is advisable that all eyelet blanks with identical orientation—at the same angle with respect to the process direction—are produced in the same step of the process. This approach is especially recommended when incising the eyelet blanks by punching or shearing. Other, differently orientated eyelet blanks are advantageously cut in one or several steps of the process, grouped by their orientation. During or after the incision of the eyelet blanks, they are bent out of the base plate. This can for instance be done using suitable dies. A particularly preferred method for the production of the mounting device is the production of the mounting eyelets through shearing. There, the eyelet blanks are incised and bent out of the base plate in the same step of the process. It is advisable that the eyelet blanks of one group which are nested to one another are sheared one after the other. Preferably, the process is started with the innermost eyelet blank, continues with the next ones until it reaches the outermost one, which is finally cut free by shearing and bent out of the base plate.

The metallic material of the base plate is not restricted to particular metals. Soft metallic materials, such as Cu or Al, can be used in principle. However, such metals which possess elastic properties are preferred. Most preferred is steel and especially spring steel or spring-hard steel. The base plate moreover can be coated completely or partially at least on one surface. The coating can for instance improve the corrosion resistance or the sliding friction.

BRIEF DESCRIPTION OF THE DRAWINGS

In the following, the present invention is described further on the basis of exemplary embodiments illustrated in various drawings. However, these drawings describe only some preferred embodiments of the mounting device and variations of the method without restricting the invention thereto. Identical parts are referred to by identical reference numbers. The figures schematically show:

FIG. 2(b) The eyelet blanks from FIG. 2(a) after bending them out of the base plate, FIG. 2(c) A perspective view on the bent mounting eyelets of FIG. 2(b) in the direction of arrow A, FIG. 3(a) A top view on the base plate in the area of a group of eyelet blanks with two eyelet blanks, FIG. 3(b) A side view on the mounting eyelet arrangement of FIG. 3(a) after the eyelets have been bent out of the base plate, FIG. 4 A top view on a group with three eyelet blanks which are designed differently, FIG. 5 A top view on a group with three eyelet blanks with rounded course of the arc, FIG. 6 A top view on group with three eyelet blanks two of which are cut through in their crest area, FIG. 7 A partial top view on a base plate with groups of eyelet blanks, which are arranged in a raster with angles of 60° relative to each other, FIG. 8 A top view on another base plate with several groups of eyelet blanks, which are arranged with irregular rotation relative to each other on the base plate with some of the eyelet blanks being cut through, FIG. 9(a) A side view of a group of eyelets bent out of the base plate ready to take up a counterpart with mounting protrusions, FIG. 9(b) Mounting device and counterpart of FIG. 9(a) in fastened state, FIGS. 10(a) to 10(c) The process of fastening the mounting protrusions at the mounting eyelets of a mounting device according to the invention, FIGS. 11(a) to 11(d) The engagement of two mounting devices according to the invention, in which a part of or all mounting eyelets are cut through, FIG. 12 A top view on another base plate with several groups of eyelet blanks, which are arranged in parallel rows with adjacent rows being staggered relative to each other, FIG. 13 A view through a base plate to which a counterpart is mounted FIG. 14 A partial side view on a group of mounting eyelets bent out of the base plate for illustration of the bending angle, and FIGS. 15(a) to 15(b) Top views on groups of eyelet blanks for illustration of the flank angle of the eyelet blanks.

DETAILED DESCRIPTION OF THE INVENTION

Figure 1:
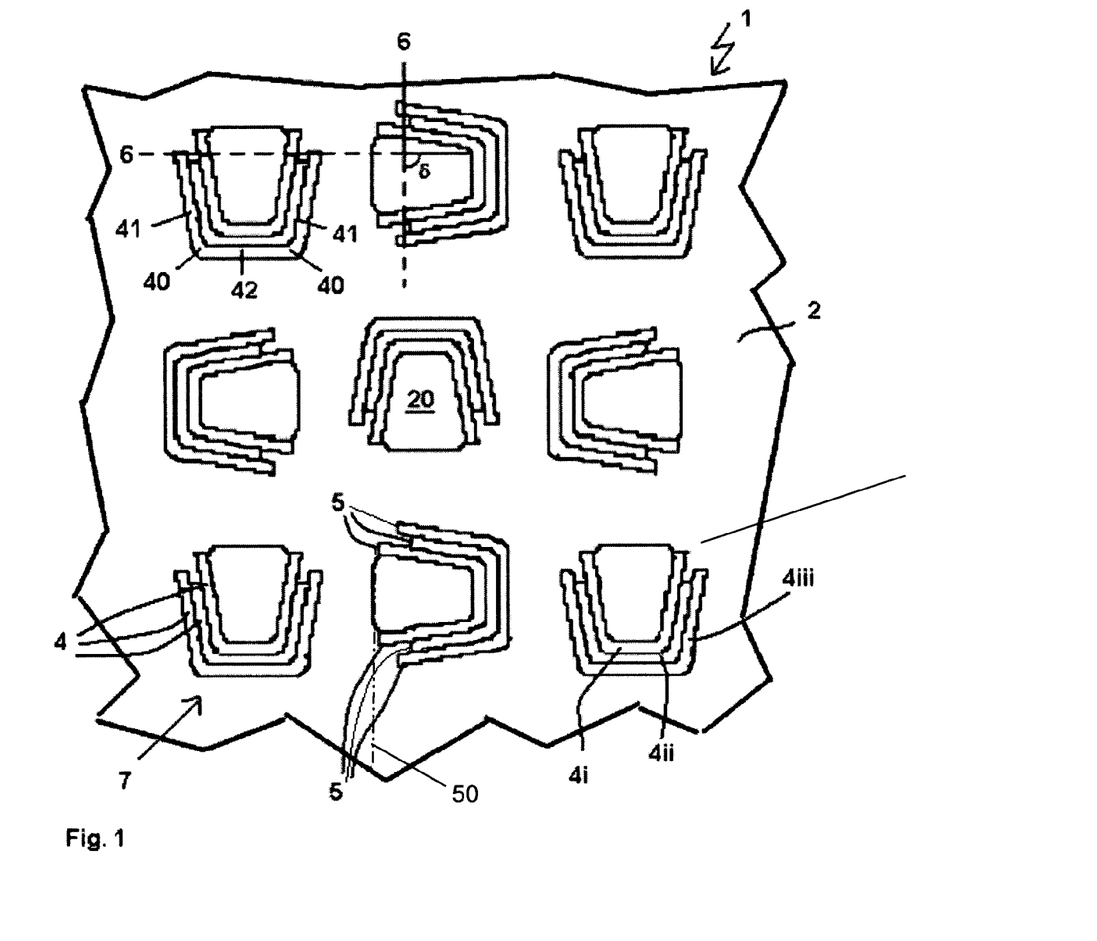
FIG. 1 A top view on a metallic base plate with incised eyelet blanks.

FIG. 1 shows a first example of a mounting device 1 according to the invention in a top view to the metallic base plate 2, which consists for example of spring steel. In this base plate 2, a total of nine groups 7 are incised which each comprise three eyelet blanks 4. As already mentioned earlier, the term blank does not comprise any restrictions with respect to order of production for the eyelets but only prescribes the geometry of the part which is bent out of the plane either after or during incising. The eyelet blanks 4 are formed as arc-shaped and in general have a U-shape. They show two angles 40, which are each followed by a flank 41 and between which a flattened crest plateau 42 extends. All eyelet blanks 4 are detached from the base plate 2 along their lateral edges of the flanks 41, the angles 40 and the crest plateau 42, they are only connected to the base plate in the area of the connection sections 5 next to the foot points of the flanks 41. Within each group 7, three eyelet blanks 4i, 4ii and 4iii are immediately nested to each other. All three eyelet blanks are essentially uniform but show different lengths of their flanks 41 and different widths of the crest plateau 42.

Figure 2A:
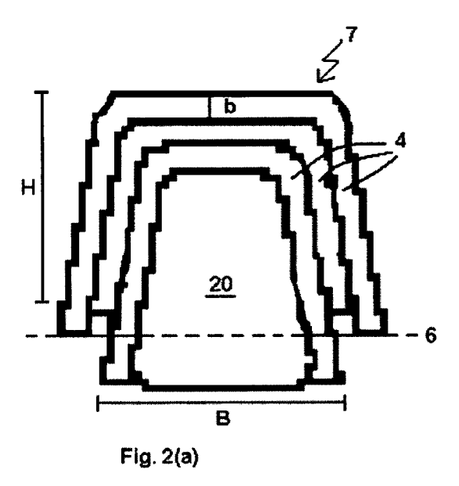
FIG. 2(a) A section of FIG. 1 in the area of a group of eyelet blanks.

With respect to their distance to the chain dotted line 50, the edge of the area 20 (or its prolongation), the bending edges 6 are offset relative to each other. The bending lines 6 of the respective outermost eyelet blank 4iii are offset upwards relative to the bending edge 6 of the innermost eyelet blank 4i in the direction of the crest plateau 42, and the bending edges 6 of the middle eyelet blank 4ii are further recessed relative to the bending edges 6 of the adjacent eyelet blanks 4i and 4iii. The area 20 within the innermost eyelet blank 4i is cut free. FIG. 2(a) shows a group with three eyelet blanks 4 of FIG. 1 in a zoomed-in representation.

The individual groups 7 with their three eyelet blanks 4 each are arranged on the base plate 2 in such a way that they are rotated relative to each other. The angle δ with which adjacent groups 7 are twisted relative to each other in each case is essentially 90°. The angles in each case refer to the angle at the intersections of the prolongations of the bending lines 6 of the eyelet blanks of neighbouring groups 7. In case the bending edge 6 of those eyelet blanks 4 which are nested with each other are not the same, the bending edge 6 is taken as reference, which is farthest away from the crests of the eyelet blanks.

Figure 2B:
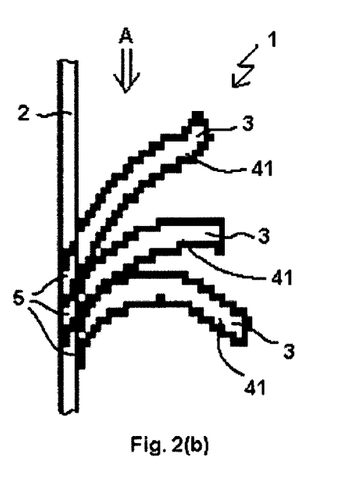
Figure 2C:
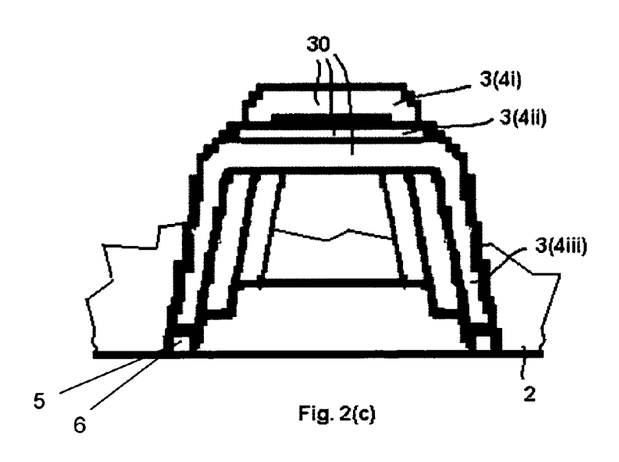

FIG. 2(b) shows an eyelet blank 4 of a group 7 of FIGS. 1 and 2(a) in the state where the eyelets have been bent out of the base plate 2. The figure represents a lateral view on the flanks 41 of the eyelet blanks, which through bending from the base plate 2 form a complete mounting eyelet 3. Due to the offset with respect to the height of the bending edges 6 within the base plate 2, mounting eyelets 3 result which are arranged in a row one after the other. The eyelet blanks are bent with different bending angles and total angles out of the base plate 2, with the bending and total angles being largest at the originally innermost eyelet blank 4i and decrease gradually towards the outermost eyelet blank 4iii. The crest plateaus of the mounting eyelets 3 essentially protrude in parallel to each other above the base plate 2 and form a bridge 30, as can be seen from FIG. 2(c). FIG. 2(c) shows a view along arrow A in FIG. 2(b) into the outermost and broadest eyelet 4iii. In the example shown, the distance of the crest plateaus 42 to the bending edges 6 of the individual eyelet blanks varies. The width B in the area of the connection sections 5 of the individual eyelet blanks 4 is varying, too. In contrast, the width of the bridge b is the same for all eyelet blanks 4.

Figure 3A:
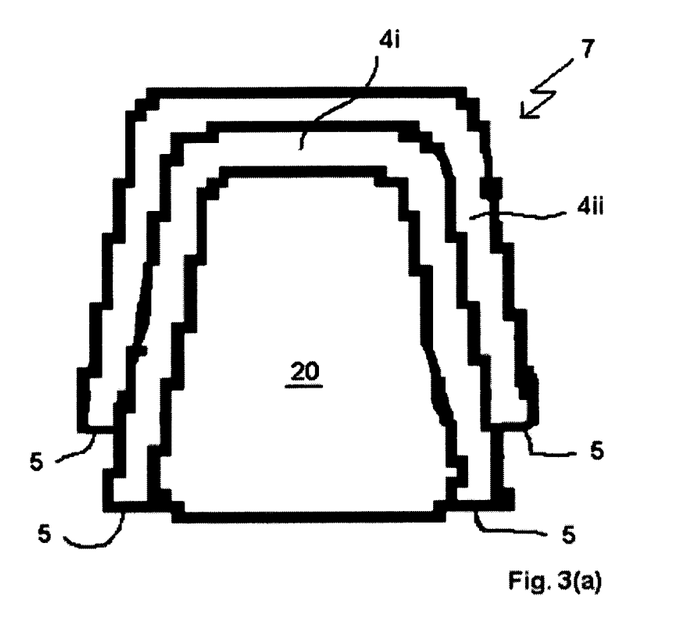
Figure 3B:
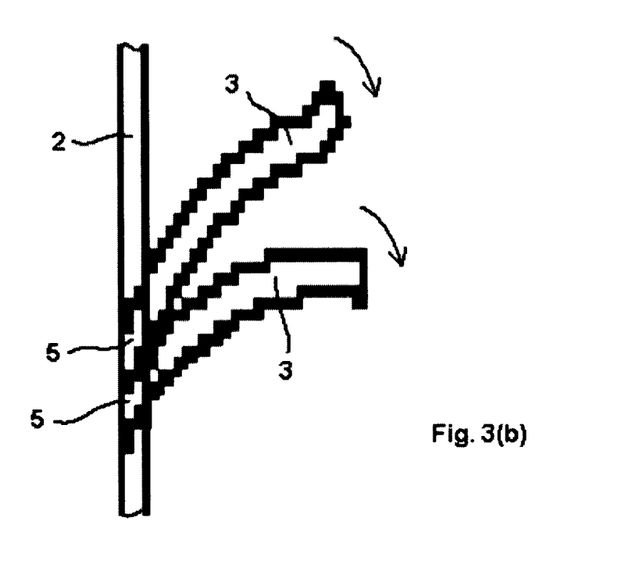

FIG. 3(a) shows a group 7 of eyelet blanks 4, which essentially corresponds to the ones of FIGS. 1 and 2(a), but here the group only comprises two eyelet blanks, 4i and 4ii. FIG. 3(b) shows the eyelet blanks 4 after bending them out of the base plate 2. It is obvious—as was in FIG. 2(b)—that the eyelet blanks at bending from the base plate 2 do not remain plan but in the bending direction (arrows) deform to arc shape.

Figure 4:
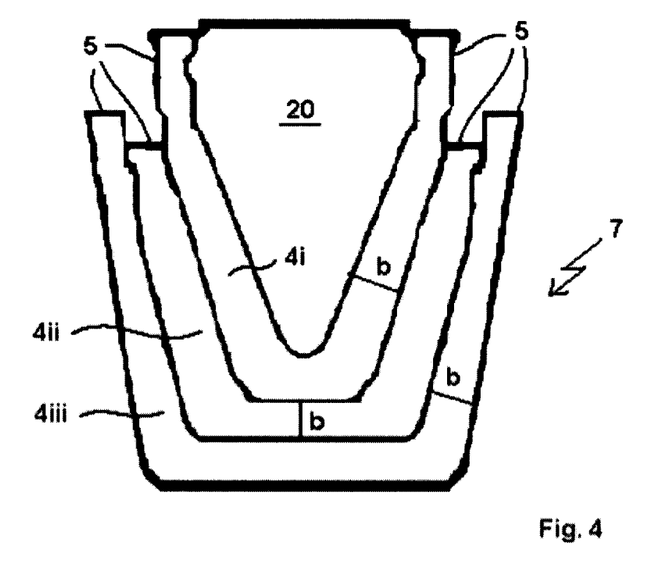

FIG. 4 shows a further top view on a further example of a group of eyelet blanks 4. Here, the individual eyelet blanks 4i, 4ii and 4iii have different shapes. The width of the bridge b alters in the course of the bridge between the respective connection sections 5 or bending edges 6. The innermost eyelet blank 4i is essentially V-shaped while the outer eyelet blanks 4ii and 4iii are essentially U-shaped.

Figure 5:
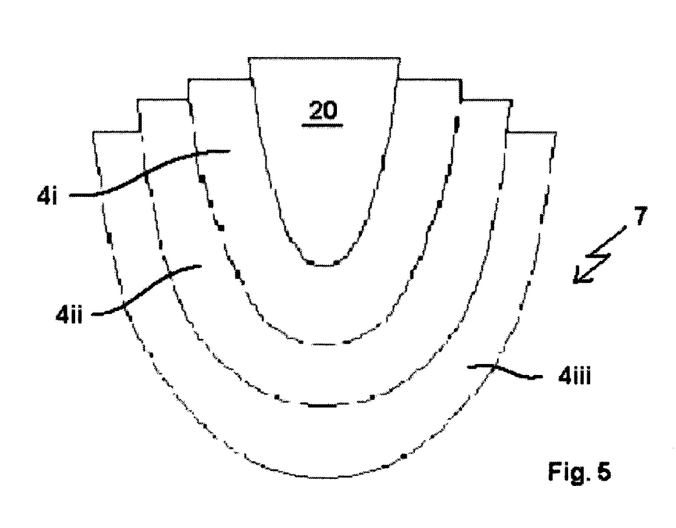

FIG. 5 shows an example of rounded eyelet blanks 4. The course of the bridge is always essentially oval. Within the innermost eyelet blank 4i, an area 20 that has been cut-out of the base plate 2 is visible.

Figure 6:
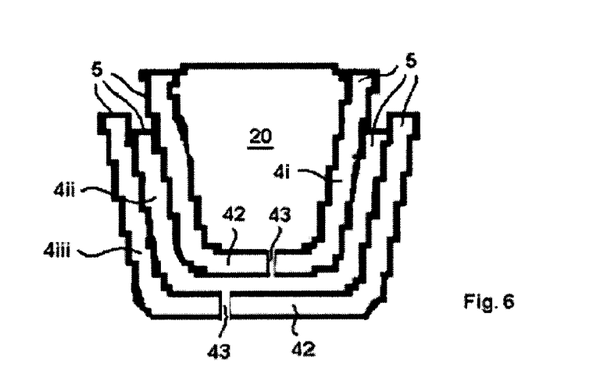

FIG. 6 shows a group 7 of eyelet blanks 4, which essentially corresponds to the one of FIG. 2(a). In contrast to the latter one, here two eyelet blanks, namely the innermost 4i and the outermost 4iii, are cut through in the area of the crest plateau so that they do not form a bridge. The areas 43 which have been cut through are offset relative to each other in the example depicted. It is however also possible that all cutting lines within one group continuously extend on one line. After bending the eyelet blanks from the base plate 2, open eyelets result, which increases the number of engaging opportunities for the mounting protrusions of a counterpart to be fastened.

Figure 7:
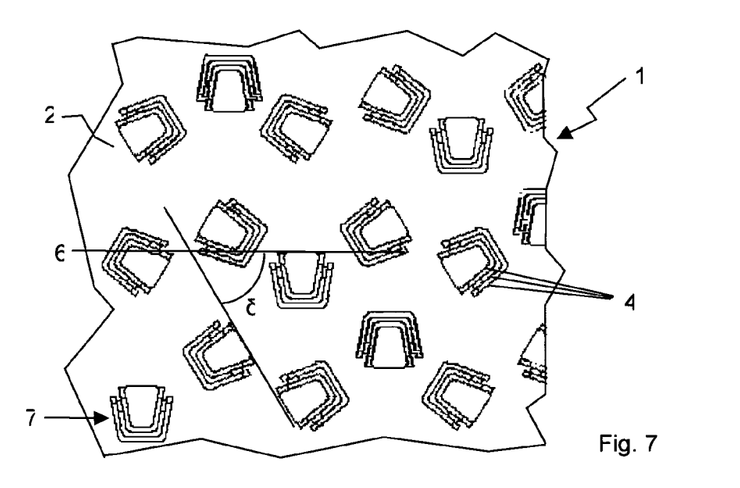

In FIG. 7, a further partial top view on a base plate 2 of a mounting device 1 according to the invention is demonstrated. The base plate again comprises a plurality of groups 7, each with three eyelet blanks 4, which are already cut free from the base plate 2, but not yet bent out of it. In contrast to FIG. 1, the groups of eyelet blanks now are rotated at an angle δ or a multiple of it relative to each other.

Figure 8:
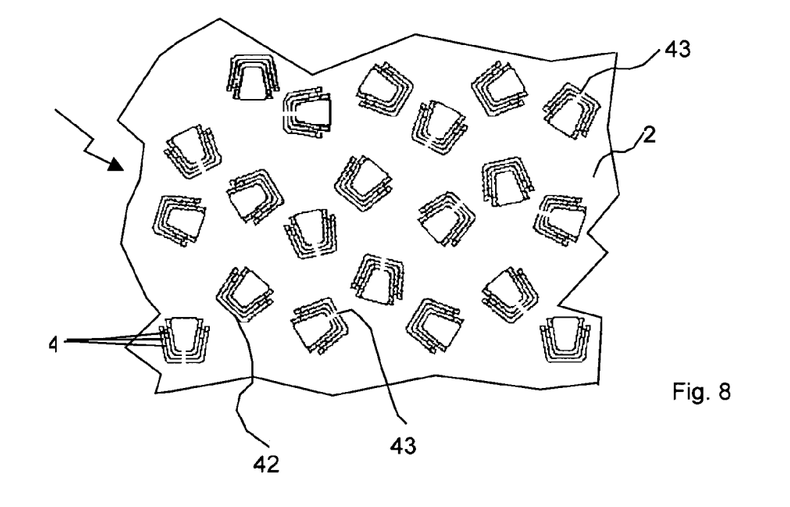

FIG. 8 shows a further example of the arrangement of groups of eyelet blanks on a base plate 2. Here, the groups are randomly arranged on the surface and are rotated at random angles relative to each other. Moreover, in some of the eyelet blanks 4—namely for all eyelet blanks of a particular group 7—the crest plateau 42 is cut through in its middle so that, after bending of the eyelet blanks 4 out of the base plate, two hook-like eyelets result, the ends of which point toward each other.

Figure 9A:
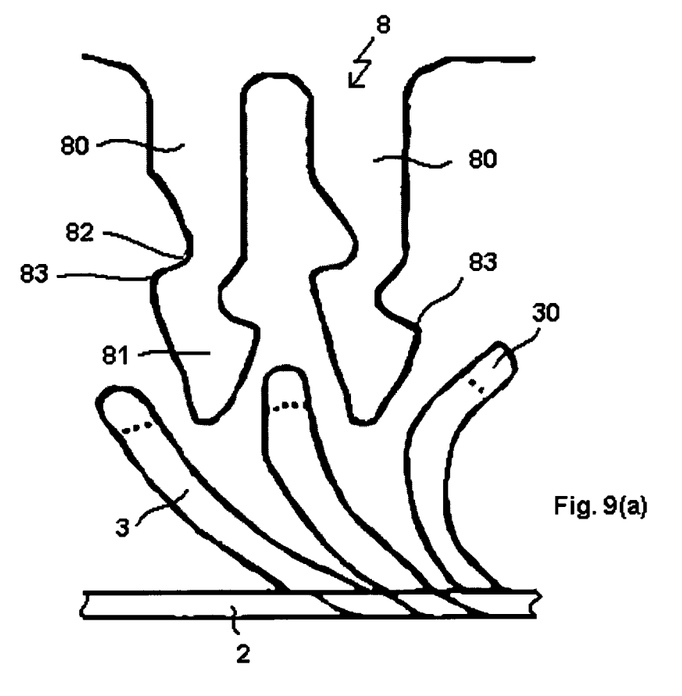
Figure 9B:
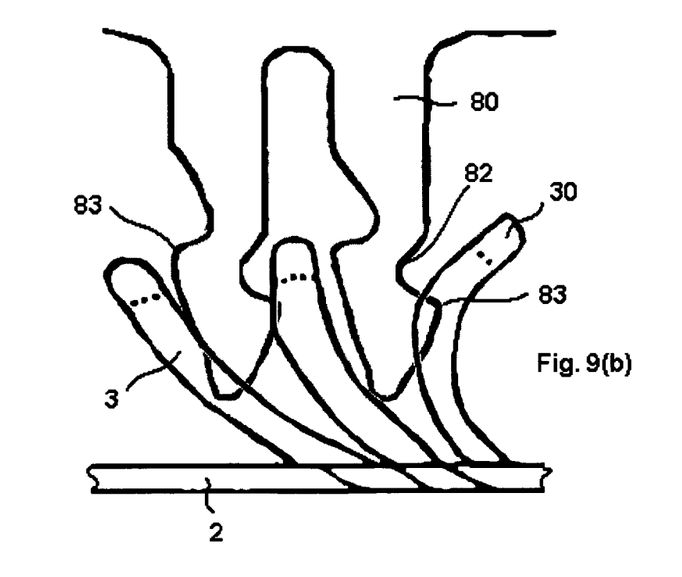

FIGS. 9(a) and 9(b) demonstrate schematically in which way a counterpart 8 with its mounting protrusions 80 can be fixed detachably to a mounting device as has been described in the context of FIGS. 1 and 2. The counterpart 8 has preferably been selected from the ones described in the publications of the applicant, which have been mentioned earlier. The mounting protrusions 80 of the counterpart 8 advantageously have been produced by incising of the corresponding blanks into the metallic base plate and consecutive bending of the mounting protrusions out of the base plate. Thus, their production is similar to the one of the mounting device according to the invention. The mounting protrusions with their incised base plates point towards the observer of the figure. The mounting protrusions 80 as such are flat and in a direction orthogonal to the paper plane have a thickness which corresponds to the thickness of the metal layer from which they have been bent out. The mounting protrusions 80 each show asymmetric heads 81, which are followed by a constricted neck 82 and correspondingly possess latch-like protrusions 83 on both sides. If one moves the counterpart 8 from the position shown in FIG. 9(a) further in the direction of the mounting device according to the invention, the inclined ends of the heads 81 engage between the mounting eyelets 3 and move the latter apart from each other until the mounting protrusions 83 shown at the right hand side in the figure come to lie behind the crest plateaus of the bridges of the mounting eyelets, with the crest plateaus running orthogonally to and into the plane of the figure. The mounting eyelets 3 now spring back again, so that the protrusions 83 come to lie behind the bridges of the mounting eyelets and lock with the latter.

Figure 10A:
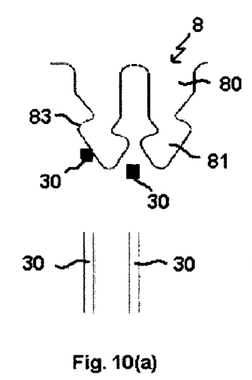
Figure 10B:
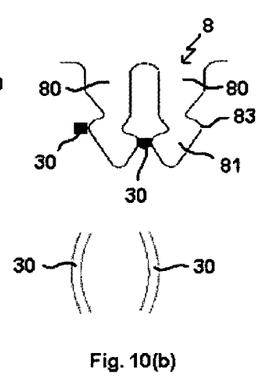
Figure 10C:
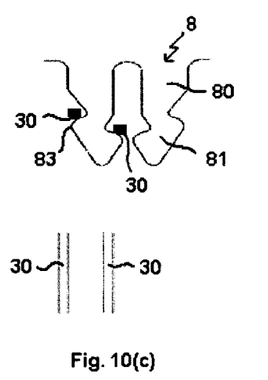

These steps are depicted once more but in a different representation in FIGS. 10(a) and 10(c). The mounting protrusions 80 are always depicted at the upper side of the figures and essentially correspond to the ones of FIG. 9 except for their mirror-symmetric arrangement relative to each other. In the lower part of the sketches, schematic top views on cross webs of mounting eyelets are shown with the bridges running next to each other. The bridges 30 are also given as black points in the upper part of FIGS. 10(a) to 10(c), namely in a sectional view. As is obvious, the bridges 30 of the mounting eyelets are offset relative to each other with respect to their height. FIG. 10(a) shows the state where the counterpart 8 approaches the mounting device according to the invention. The head 81 of the left mounting device 80 glides into the area between two neighbouring bridges. In FIG. 10(b) the head 81 has engaged that much in between the cross webs 30, so that they have been moved to their maximum distance and are deformed elastically. After further movement of the mounting protrusions 80 in the direction of the mounting device 1, the state shown in FIG. 10(c) has been reached, in which the two mounting eyelets with their cross webs 30 have snapped behind the protrusions 83 of the mounting element. The closure is a detachable one, as the process can be done at inverse direction and the mounting protrusions 80 can again be removed from between the holding eyelets. This process can be repeated as often as desired.

FIGS. 9 and 10 each demonstrate an example with which a mounting protrusion snaps between two mounting eyelets. However, there is a much larger variety of snapping opportunities. It is for instance possible that two neighbouring mounting protrusions take up one or more mounting eyelets between them. Inversely, it is also possible that several mounting protrusions snap in the clearance between neighbouring mounting eyelets. Moreover, one or more mounting protrusions can also be taken up between adjacent mounting eyelets of neighbouring groups.

Figure 11A:
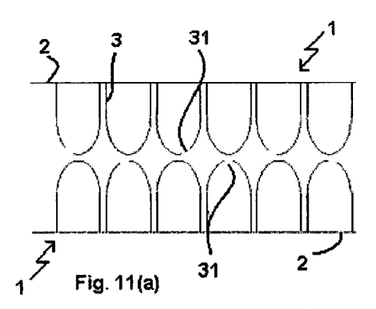
Figure 11B:
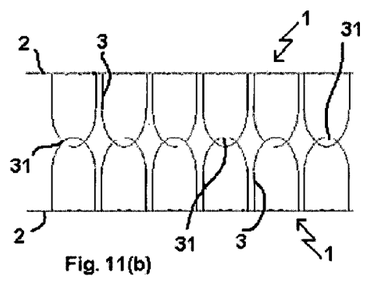
Figure 11C:
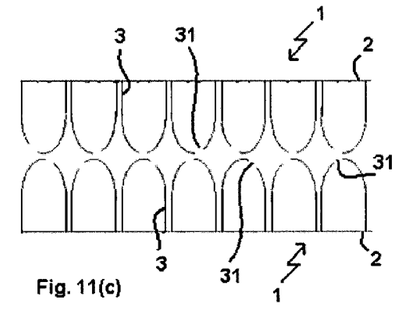
Figure 11D:
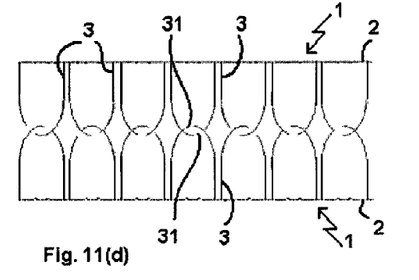

FIGS. 11(a) to 11(d) demonstrate considerably simplified examples of mounting devices, in which several or all mounting eyelets are cut through in their crest area 42. In FIGS. 11(a) and 11(b) each alternating mounting eyelet disposes of an opening 31 in its crest area. In the examples of FIGS. 11(c) and 11(d) each mounting eyelet 3 comprises an opening 31 in the crest area. The open crest areas also allow the mounting devices 1 to be fastened one with another. Thus, it is also possible that the counterpart be a mounting device according the invention. The pairs of FIGS. 11(a) and 11(b) on the one hand and 11(c) and 11(d) on the other hand each demonstrate the mounting process of two identical mounting devices 1 to each other. The upper row, i. e., FIGS. 11(a) and 11(c), show the state in which the two mounting devices 1 approach each other (see arrows on the left hand side) but have not hooked yet. The hooked state is shown in the lower row in FIGS. 10(b) and 10(d). The mounting devices 1 in each case hook with each other in the area of the openings 31. In general, the percentage of mounting devices 1 with cut-through crest area can vary to a large degree. This is also true for their percentage when two mounting devices 1 according to the invention are connected with each other.

Figure 12:
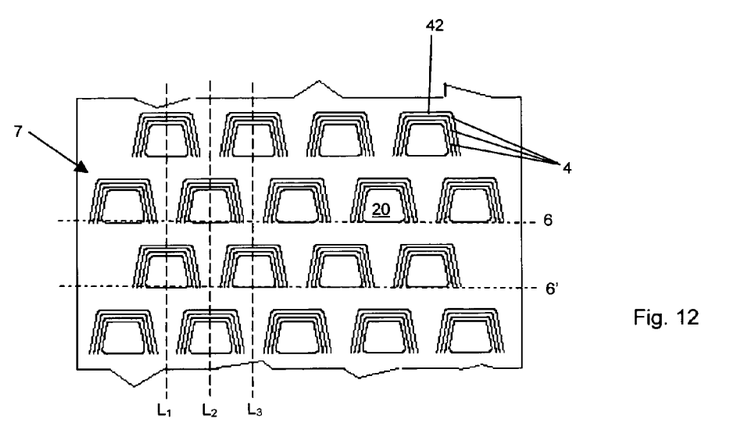

FIG. 12 shows a top view on a section of another base plate with several groups 7 of eyelet blanks 4 in the non-bent state. These groups 7 are arranged in parallel rows with the groups in neighbouring rows being staggered relative to each other. Dash-dotted lines have been added which run through the bending edges 6 and demonstrate the parallel arrangement of the rows. In the example depicted, the rows contain four and five groups 7 of eyelet blanks 4. Dashed lines $L_1$, $L_2$ and $L_3$ have been added which are arranged orthogonal to the dash-dotted lines and which intersect the eyelet blanks in such a way that they divide the groups 7 of eyelet blanks 4 into two parts with both parts extending from the bending lines 6 to the bridges 42. It is obvious that the staggering is such that groups of every second row come to lie on the same dashed line.

Figure 13:
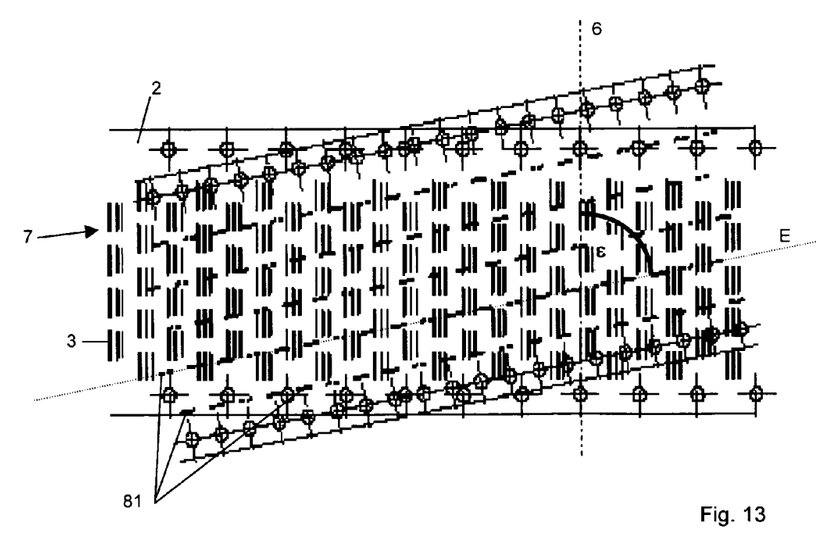

FIG. 13 depicts a fixed connection between a base plate 2 with groups 7 of eyelets 3 and a counterpart 8 with a multitude of heads 81. The groups 7 of eyelets are arranged as in FIG. 13, thus in parallel and staggered, but are bent out of the plane of the base plate 2. In the counterpart 8, the heads 81 are also arranged in parallel and staggered, for example, on a line E which runs in parallel to the outer edge of the counterpart strip. The lines which indicate the heads 81 correspond to the area of the heads 81 onto which one looks in FIGS. 9 and 10. As is obvious in FIG. 14, the base plate 2 and the counterpart 8 are mounted in such a way that their outer edges are angled relative to each other. The same is true for the orientation of the mounting eyelets 3 which are parallel to the exemplary bending line 6 and the orientation of the heads 81 which are parallel to line E. In total, lines 6 and E span an angle $\epsilon$ which in the given example corresponds to about 70 to 80°. It follows from FIG. 14 that the heads 81 are able to hook into the mounting eyelets 3 in a large range of angles $\epsilon$. The only orientation which does not allow for any hooking is given at an angle $\epsilon$ equal or close to 0°. The angle between the areas of the heads 81 (here represented by lines 81) and the mounting eyelets 3 (here represented by the bending line 6) can thus vary between 25 and 155°, preferably between 40 and 140° and most preferable will be between 65 and 115° in order to allow a large number of heads 81 to hook into the mounting eyelets 3.

Figure 14:
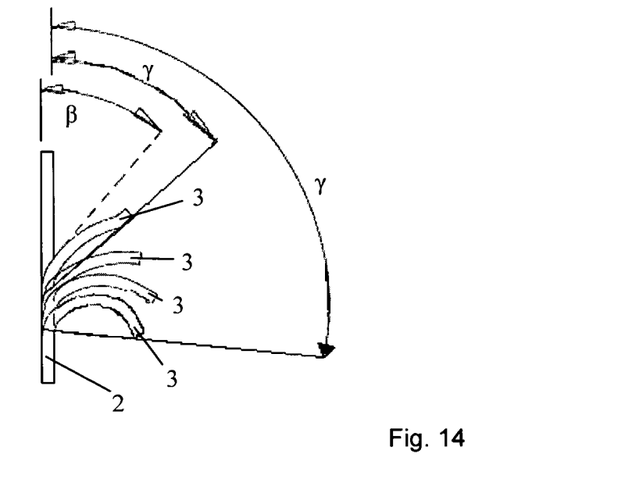
Figure 15:
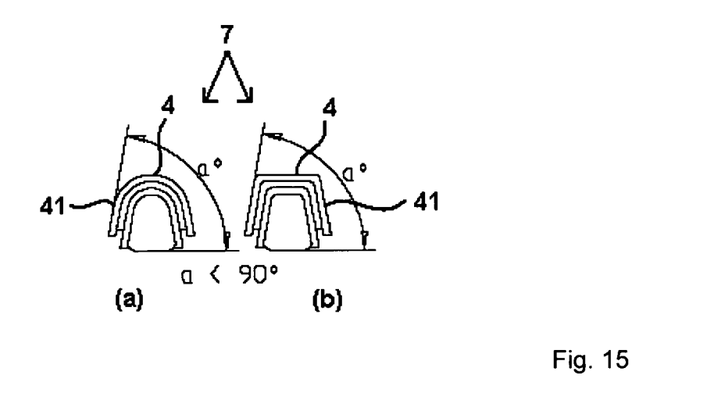

FIGS. 14 and 15 each demonstrate some details of forming the mounting eyelets 3 or the eyelet blanks 4, respectively. FIG. 14 shows the bending angle $\beta$ with which the eyelet blanks 4 are bent out of the base plate 2 in order to provide the mounting eyelets. There, the bending angle in each case is the angle between a tangent which in the area of the bending edge is drawn to the mounting eyelet 3, and the plane of the base plate 2. The most flat mounting edge has a bending angle $\beta$ of about 40°. Further, in FIG. 14, a total angle $\gamma$ is depicted, which in each case spans between the base plate and the line, which extends from the bending edge to the crest of the eyelet. For the innermost eyelet, this angle is about 50°, while for the outermost eyelet it is more than 90°, here about 97°. The total angle $\gamma$ thus does not describe the curvature of the eyelets but the position of the bridge relative to the bending edge and the base plate. The angles $\beta$ and $\gamma$ as shown always relate to one surface of the base plate.

FIG. 15 demonstrates the inclination of the flanks 41 of the eyelet blanks 4 or of the completed eyelets 3. The flank angle $\alpha$ here is the angle which extends between the bending edge 6 and the outer side of the flank 41. The angle $\alpha$ is preferably smaller than 90°. The flanks thus run to the inside towards each other.

The invention claimed is:

1. A mounting device with a metallic base plate above which a plurality of mounting eyelets protrude, comprising: a first plurality of arc-shaped eyelet blanks incised as a first group into the base plate with at least two eyelet blanks, and at least a second plurality of arc-shaped eyelet blanks incised as a second group into the base plate with at least two eyelet blanks, each of said blanks of said groups being nested in such a way that at least a subarea of one eyelet blank is arranged within another eyelet blank within each respective group, wherein said at least two eyelet blanks in said first group have different bending edges compared to one another and said at least two eyelet blanks in said second group have different bending edges compared to one another, and said bending edges between said groups are different
   wherein said eyelet blanks comprise:
   an angle ($\alpha$) between an inner side of a flank of an eyelet blank and a bending edge smaller than 90°, a flattened crest plateau,
a width of a bridge (b) of at least 0.05 mm, and at most 0.5 mm,
a width (B) in an area of connection sections of at least 0.4 mm, a height (H) of between 0.5 mm to 10 mm.

2. The mounting device of claim 1, wherein said eyelet blanks are incised as groups into the base plate with two to ten eyelet blanks per group.

3. The mounting device of claim 1, wherein said eyelet blanks are incised as groups into the base plate with two to five eyelet blanks per group.

4. The mounting device of claim 1, wherein the eyelet blanks are designed as rounded arcs or angular with a course of a bridge showing one to four angles.

5. The mounting device of claim 4, wherein the eyelet blanks are designed as rounded arcs or angular with the course of a bridge showing two angles.

6. The mounting device of claim 1, wherein the eyelet blanks immediately border one to another.

7. The mounting device of claim 1, wherein said angle ($\alpha$) is between 40° and 85°.

8. The mounting device of claim 1, wherein the width (b) of the bridge is at least 0.15 mm, and at most 0.2 mm.

9. The mounting device of claim 1, wherein the width (B) in the area of the connection sections is between 0.5 and 10 mm.

10. The mounting device of claim 1, wherein the height (H) is between 1 mm and 4 mm.

11. The mounting device of claim 1, wherein the connection sections of the eyelet blanks are offset within one group with respect to height.

12. The mounting device of claim 1, wherein all groups of eyelet blanks are arranged on the base plate in parallel rows with at least two groups of eyelet blanks per row, with the groups of eyelet blanks in neighbouring rows staggered to one another.

13. The mounting device of claim 1, wherein all groups of eyelet blanks are arranged on the base plate in parallel rows with at least four groups of eyelet blanks per row, with the groups of eyelet blanks in neighbouring rows staggered to one another.

14. The mounting device of claim 1, wherein at least part of the mounting eyelets are cut through in their crest area.

15. A mounting device with a metallic base plate above which a plurality of mounting eyelets protrude, comprising: a first plurality of arc-shaped eyelet blanks incised as a first group into the base plate with at least two eyelet blanks, and at least a second plurality of arc-shaped eyelet blanks incised as a second group into the base plate with at least two eyelet blanks, each of said blanks of said groups being nested in such a way that at least a subarea of one eyelet blank is arranged within another eyelet blank within each respective group, wherein said at least two eyelet blanks in said first group have different bending edges compared to one another and said at least two eyelet blanks in said second group have different bending edges compared to one another, and said bending edges between said groups are different, wherein the mounting eyelets are bent arc-shaped out of the base plate with a total angle ($\gamma$) of 30° to 135° and wherein at least two mounting eyelets of a group are bent out of the base plate at different total angles ($\gamma$).

16. A mounting device with a metallic base plate above which a plurality of mounting eyelets protrude, comprising: a first plurality of arc-shaped eyelet blanks incised as a first group into the base plate with at least two eyelet blanks, and at least a second plurality of arc-shaped eyelet blanks incised as a second group into the base plate with at least two eyelet blanks, each of said blanks of said groups being nested in such a way that at least a subarea of one eyelet blank is arranged within another eyelet blank within each respective group, wherein said at least two eyelet blanks in said first group have different bending edges compared to one another and said at least two eyelet blanks in said second group have different bending edges compared to one another, and said bending edges between said groups are different, wherein at least part of the groups of the eyelet blanks are arranged on the base plate in such a way that they are rotated relative to other groups of eyelet blanks.

17. The mounting device of claim 16, wherein the groups of eyelet blanks are rotated relative to each other at an angle ($\delta$) of between 30° and 180°.

18. The mounting device of claim 16, wherein the groups of eyelet blanks are rotated relative to each other especially at an angle ($\delta$) of essentially 60°, 90° or 180°.

19. A mounting device with a metallic base plate above which a plurality of mounting eyelets protrude, comprising:
a first plurality of arc-shaped eyelet blanks incised as a first group into the base plate with at least two eyelet blanks;
at least a second plurality of arc-shaped eyelet blanks incised as a second group into the base plate with at least two eyelet blanks;
each of said blanks of said groups being nested so that at least a subarea of a first eyelet blank is arranged within a second eyelet blank within each respective group;
wherein said eyelet blanks comprise:
an angle ($\alpha$) between an inner side of a flank of an eyelet blank and a bending edge smaller than 90°,
a flattened crest plateau,
a width of a bridge (b) of at least 0.05 mm, and at most 0.5 mm,
a width (B) in an area of connection sections of at least 0.4 mm,
a height (H) of between 0.5 mm to 10 mm.

20. A mounting device with a metallic base plate above which a plurality of mounting eyelets protrude, comprising:
a first plurality of arc-shaped eyelet blanks incised as a first group into the base plate with at least two eyelet blanks; and
at least a second plurality of arc-shaped eyelet blanks incised as a second group into the base plate with at least two eyelet blanks;
each of said blanks of said groups being nested in such a way that at least a subarea of a first eyelet blank is arranged within a second eyelet blank within each respective group;
wherein the mounting eyelets are bent arc-shaped out of the base plate with a total angle ($\gamma$) of 30° to 135°;
wherein at least two mounting eyelets of a group are bent out of the base plate at different total angles ($\gamma$).

* * * * *